(12) United States Patent
Moganti

(10) Patent No.: US 8,515,490 B2
(45) Date of Patent: Aug. 20, 2013

(54) METHOD AND APPARATUS FOR PROVIDING SAME SESSION SWITCHOVER BETWEEN END-USER TERMINALS

(75) Inventor: Madhav Moganti, Piscataway, NJ (US)

(73) Assignee: Alcatel Lucent, Paris (FR)

( * ) Notice: Subject to any disclaimer, the term of this patent is extended or adjusted under 35 U.S.C. 154(b) by 1885 days.

(21) Appl. No.: 11/026,498

(22) Filed: Dec. 30, 2004

(65) Prior Publication Data

US 2006/0146767 A1 Jul. 6, 2006

(51) Int. Cl.
*H04M 1/00* (2006.01)
(52) U.S. Cl.
USPC ....... 455/556.1; 455/418; 455/41.2; 709/203; 709/206; 370/338; 370/401
(58) Field of Classification Search
USPC ........ 370/338, 401; 455/414.1, 412.1–412.2, 455/410–411, 41.2, 426, 507–509, 426.1, 455/556.2, 466; 709/203, 219, 227–228; 713/168; 380/247
See application file for complete search history.

(56) References Cited

U.S. PATENT DOCUMENTS

| | | | | |
|---|---|---|---|---|
| 5,027,269 A * | 6/1991 | Grant et al. | | 709/224 |
| 5,559,800 A * | 9/1996 | Mousseau et al. | | 370/401 |
| 7,546,630 B2 * | 6/2009 | Tabi | | 726/2 |
| 7,653,645 B1 * | 1/2010 | Stokes | | 707/999.102 |
| 7,921,208 B2 * | 4/2011 | Hochwarth et al. | | 709/225 |
| 8,150,422 B2 * | 4/2012 | Eldering | | 455/457 |
| 2003/0055977 A1 * | 3/2003 | Miller | | 709/227 |
| 2003/0110266 A1 * | 6/2003 | Rollins et al. | | 709/227 |
| 2003/0126441 A1 * | 7/2003 | Laux et al. | | 713/168 |
| 2003/0195963 A1 * | 10/2003 | Song et al. | | 709/227 |
| 2004/0068572 A1 * | 4/2004 | Wu | | 709/229 |
| 2005/0066037 A1 * | 3/2005 | Song et al. | | 709/227 |
| 2006/0242278 A1 * | 10/2006 | Hawkins | | 709/221 |
| 2008/0114830 A1 * | 5/2008 | Welingkar et al. | | 709/203 |

FOREIGN PATENT DOCUMENTS

| | | |
|---|---|---|
| EP | 1 353 270 A | 10/2003 |
| WO | WO 2004/034192 A2 | 4/2004 |
| WO | WO 2004/088543 A | 10/2004 |

OTHER PUBLICATIONS

International Publication WO 2004/034192 (JP National Publication Gazette No. 2006-502496).
K. Ohta, New Concept Communication Feature, NTT Docomo Technical Journal, Electric.
T. Warabino, Proposal of a Device Handoff Method for Seamless Communications, IPSJ SIG Technical Report, IPSJ, vol. 2003, No. 114, pp. 105-112, Nov. 14, 2003.
Search Report in corresponding EP 05 25 7699, Feb. 28, 2006, Lucent Technologies Inc.

\* cited by examiner

*Primary Examiner* — Sharad Rampuria
(74) *Attorney, Agent, or Firm* — Wall & Tong, LLP

(57) ABSTRACT

Method and apparatus for performing switchover of a session between different user terminals. The method and apparatus includes means for receiving, from a first device, data representing a session, where the session data includes any application and authentication data required to reestablish the session. The method and apparatus facilitates suspending the session at the first device, and reestablishing the suspended session on a second device using the suspended session data.

19 Claims, 5 Drawing Sheets

METHOD AND APPARATUS FOR PROVIDING SAME SESSION SWITCHOVER BETWEEN END-USER TERMINALS

FIELD OF THE INVENTION

The present invention relates to providing network services, and more specifically, to providing same session switchover between end-user terminals.

BACKGROUND OF THE INVENTION

Various entities are building the technology and capability to offer seamless, secure roaming of wireless devices between different types of wireless networks including wireless LAN, cellular, private mobile radio, and satellite networks. For example, it is possible to have access to critical business data at all times, moving from location to location, while roaming over different types of networks using different types of wireless devices.

Currently, a wireless gateway automatically detects the most appropriate wireless network at any given time, and is capable of switching between networks without the need to restart the device or the application. Such roaming capability enables, for example, a business person located at home to be able to access data from the office using a mobile device (e.g., PDA) coupled to their home wireless LAN network. Alternatively, after leaving the home and moving out of range of the wireless LAN network, the device automatically switches over to a cellular network. Upon entering the office or a customer location, the device can then switch over to a higher speed wired or wireless LAN. In each of the abovementioned roaming techniques, the end-user utilizes the same computer device, which roams between networks.

Further, the current roaming capabilities of wireless networks are able to recognize the most appropriate time and network to transfer large amounts of data between a mobile device and back-end systems. This ability helps avoid the use of more costly, slower speed cellular networks, for example, during instances where large amounts of data transfers can wait for a less expensive, higher bandwidth Wi-Fi or wireless LAN network. Thus, today's roaming capabilities allow data to be accessed regardless of the wireless network that is available at a given location.

Although a user of a mobile device is able to roam between networks, the current technology does not allow for a user of a mobile device to switch over between different end-user terminals, while maintaining a current session. That is, if a user establishes a service session for information with a first end-user terminal and seeks to transfer this session to different end-user terminal, illustratively at a different location, the end-user must first terminate the initial session at the first terminal, and then reconnect via a second session at the second end-user terminal to continue with a service or application.

For example, an end-user may be playing a video game over the internet, which was established at a first computer terminal in the user's home. The user may wish to continue playing the same game without ending the game at a different location (e.g., the airport). To do so, the end-user must first terminate the current session at the first computer terminal (e.g., laptop computer device) at the user's home, and then must re-establish a new session at a computer device (e.g., PDA) located at the airport. If the user ends the session during the middle of the game, in many instances, the user will have to restart a new game without being able to continue with the same session where the user left off at the first computer terminal. Accordingly, there is a need in the art to perform a seamless switchover of a session between different end user terminals without having to establish a new session at the second end-user terminal.

SUMMARY OF THE INVENTION

The present invention is a mobile end-user agent device (MEAD) that may be used to keep track of authentication, end-user application sessions, and user profiles to provide a seamless switchover between different end-user terminals (i.e., computer devices). The mobile end-user agent device of the present invention facilitates roaming capabilities between different end-user terminals that may be connected to different networks. The MEAD allows an end-user to initiate a session for services and/or information from a first end-user terminal, temporarily suspend (i.e., freeze or pause) the current session, and then initiate the very same session on a different end-user terminal at a later time.

In one embodiment, a method of the present invention includes performing switchover of a session between different user terminals. The method comprises receiving, from a first device, data representing a session, where the session data comprises any application and authentication data required to reestablish the session. The MEAD is used to suspend the session at said first device, and subsequently, reestablish the suspended session on a second device using the suspended session data.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, when appropriate, to designate identical elements that are common to the figures.

DETAILED DESCRIPTION OF THE INVENTION

Figure 1:
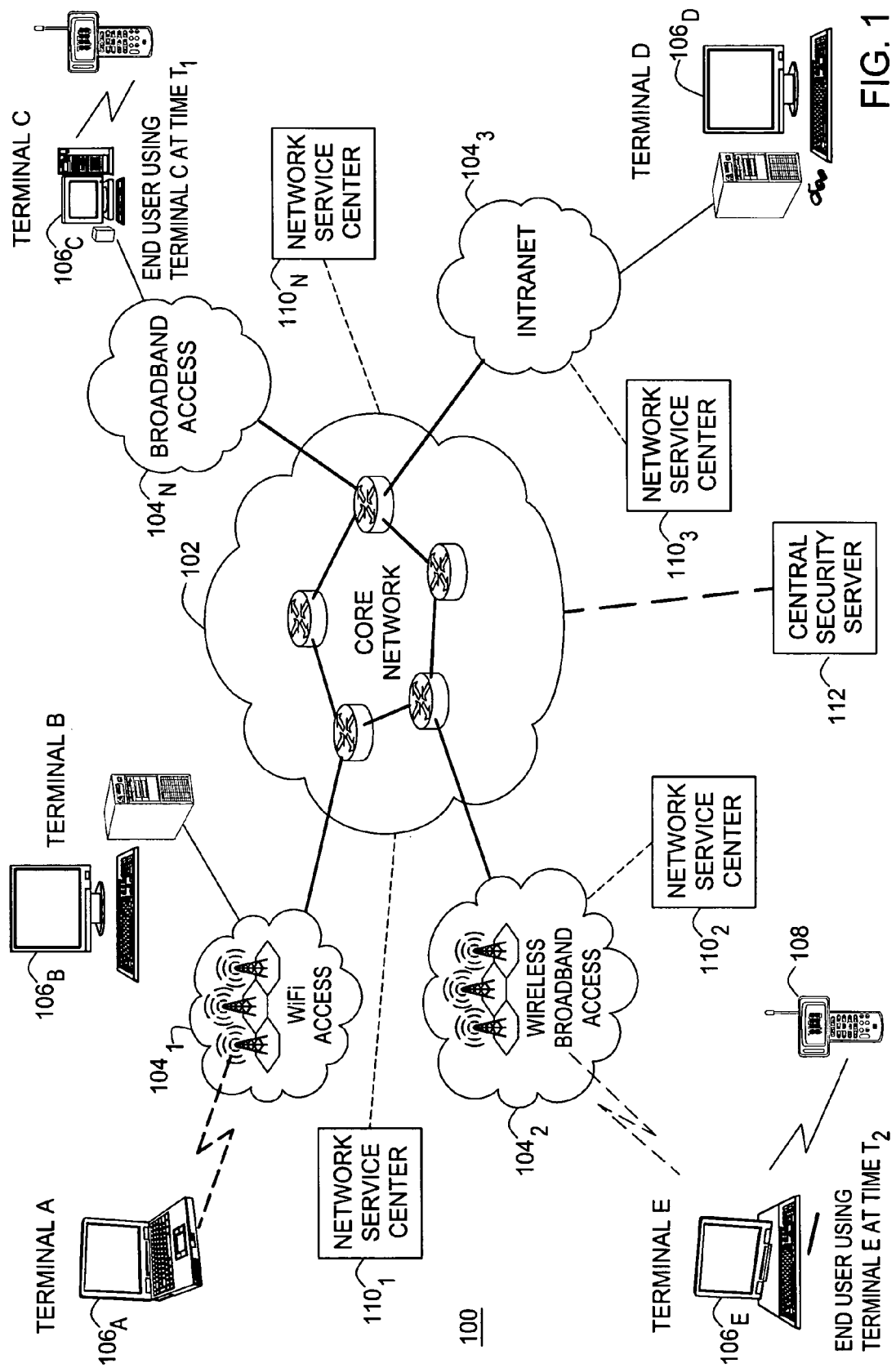
FIG. 1 depicts a block diagram of a network environment suitable for implementing the present invention.

The present invention is a mobile end-user agent device (MEAD) that may be used to keep track of authentication, end-user application sessions, and user profiles to provide a seamless switchover between different end-user terminals (i.e., computer devices). The mobile end-user agent device of the present invention facilitates roaming capabilities between different end-user terminals that may be connected to different networks. The MEAD allows an end-user to initiate a session for services and/or information from a first end-user terminal, temporarily suspend (i.e., freeze or pause) the current session, and then initiate the very same session on a different end-user terminal at a later time.

Specifically, while the session is initiated and actively utilized by an end-user, the session information (e.g., session data and status) is recorded (i.e., stored) on the MEAD. Thus, the MEAD is capable of storing session data, as well as data associated with the applications that the user uses during the session. The user may suspend the session, wherein by storing pertinent session information, the end-user is able to roam (i.e., relocate) from one location to another location, and continue with the same session at a later time from a different computer device from where the session originated.

To transfer a single session from one end-user terminal to another end-user terminal, the terminals store information associated with the end-user network, the services being provided, as well as the application attributes to automatically provide network access from a different end-user terminal having networking capabilities. The end-user terminals are indifferent to the type of network where the session originated. That is, the end-user terminals may be connected to the network by different types of network access including cable, FTTH, ADSL, wireless LAN, cellular, private mobile radio, and satellite networks, among other types of networks. For example, the user may initiate a session from a first terminal associated with a wireless access network, record the session information up until the session is suspended at the first terminal, and subsequently restart the same session at a second terminal associated with a different type of network (e.g., an intranet access network).

Furthermore, the mobile end-user agent device provides authentication and security features in order to ensure end-user privacy and to keep end-users in control of their information. Accordingly, the transactions between the MEAD and the end-user terminals are completely secure and are based on end-user authentication. In one embodiment, security is provided by storing data from the transactions with the end-user terminals on the MEAD in an encoded format. In one embodiment, encoding key codes are changed at regular intervals, and then data is encoded with new key codes and stored at these intervals. In an embodiment, the end-user applications/service session data on the end-user terminals is also encoded. Moreover, in one embodiment, the memory on the end-user terminals that stores the encoded session related data is erased before the end-user leaves the terminal. This ensures that other individuals cannot access any the of the end-user's session information. In one embodiment, the key codes are also stored in an encoded format. To decode the key codes, the end-user must initiate an authentication process (e.g., provide a password or bio-metric authentication).

Thus, the MEAD is capable of initiating and terminating communications between itself and the end-user terminals associated with the same or different networks, and provides end-users with the same look and feel of the applications and services from one end-user terminal to another end-user terminal. For example, the present invention is capable of providing an end-user with access to the same attributes established in a particular application used at a first terminal, such as bookmarks in a web browser, when switching over to a second end-user terminal. The embodiments of the present invention are discussed below in further detail with respect to FIGS. 1-4.

FIG. 1 depicts a block diagram of a network environment 100 suitable for implementing the present invention. The network 100 includes a plurality of end-user terminals, such as terminals A-E $106_a$ to $106_e$ (collectively end-user terminals 106), a plurality of access networks, such as access networks $104_1$ to $104_n$ (collectively access networks 104), a core network 102, at least one security server 112, and a plurality of network service centers $110_1$ to $110_n$ (collectively network service centers 110).

Each access network 104 supports a plurality of end-user terminals 106 to provide connectivity for services and content from service and content providers. The access networks 104 are coupled to each other via the core network 102. For purposes of simplifying the description of the present invention, the core network 102 is discussed as being a packet switched network, such as the internet and/or an intranet. However, one skilled in the art will appreciate that the core 102 network may be any type of network capable of providing content, services, and transport between terminals 106 and the service centers 110.

The access networks 104 may be any type of conventional access network. The exemplary network 100 of FIG. 1 illustratively includes a WiFi access network $104_1$, a wireless broadband access network $104_2$, an intranet $104_3$, and a wireline broadband access network $104_n$. However, one skilled in the art will appreciate that the access network may be any type of access network capable of providing terminal access (i.e., a communications path) to the packet switched network 100.

As shown in FIG. 1, end-user terminal A $106_a$ and terminal B $106_b$ are illustratively coupled to a Wi-Fi access network $104_1$, end user terminal C $106_c$ is illustratively coupled to a broadband access network $104_n$, end-user terminal D $106_d$ is illustratively coupled to the intranet $104_3$, and terminal E $106_e$ is illustratively coupled to a wireless broadband access network $104_2$. Each of the access networks $104_{1-n}$ (collectively access networks 104) are coupled to a core network 102. Although FIG. 1 illustratively shows a single end-user terminal 106 coupled each access network 104, a person skilled in the art will appreciate that each access network 104 is capable of providing access to the packet switched network for a plurality of end-user terminals. For example, a broadband access network, such as a DSL or cable provider is capable of providing hundreds or thousands of terminals 106 broadband services.

The end-user terminals $106_a$-$106_e$ (collectively terminals 106) may be any computer device capable of processing information and accessing a network via an access network. For example, the end-user terminals 106 may include a laptop, desktop, work station, PDA, mobile device, among other computer devices capable of providing information to the end user.

In one embodiment, each access network 104 provides access to one or more network service centers 110. In the exemplary network 100 illustratively shown in FIG. 1, network service centers $110_1$ and $110_n$ are connected to the core network 102. Further, the exemplary wireless broadband access network $104_2$ has an associated network service center $110_2$, and the intranet network $104_3$ has an associated network service center $110_3$. It is noted that one skilled in the art will appreciate that the packet switched networks 104 may be interconnected to one or more (i.e., a plurality) network service centers 110.

The network service centers 110 are capable of providing private services associated with Intranet services (like office email, databases, web-based training, and the like) and/or public end-user services (e.g., email, chat, video/audio on demand, single user or networked gaming, web-browsing, and the like). Further, the network service centers 110 may provide authentication and security services, as well as end-user profile and services management.

As shown in FIG. 1, a mobile end-user agent device (MEAD) 108 is illustratively shown in communication with terminal C $106_c$ at a time $t_1$. The MEAD 108 is used to store user session information, such as session status, security information, and session activity information, including information regarding the applications or services (both standalone or networked) the user is interacting with on the terminal C $106_c$. During the course of user activity during the session at terminal C 106$_c$, the user may wish to temporarily suspend the current session for a time, and proceed with the session at a later time and at another location. FIG. 1 also shows the MEAD 108 interacting with terminal E 106$_e$ at a time t$_2$. Accordingly, the user suspends the current session at a first end-user terminal at a time t$_1$, roams to another end-user terminal at another location, and reestablishes the temporarily suspended session at a time t$_2$.

To provide the user with same-session roaming capabilities (i.e., switchover) between end-user terminals, the MEAD 108 stores information associated with the user's session activity at terminal C 106$_c$, which includes information regarding session commencement and status at the broadband access network 104$_n$, as well as information pertaining to user activity for the application (i.e., content or program) the user is interacting with at the terminal. Further, the MEAD 108 continually updates the session information and status stored thereon, until a time at which the user chooses to suspend the current session.

The user may suspend the current session by issuing commands via the MEAD 108 to the terminal 106. Once the suspend commands are initiated by the MEAD 108, the session with the first end-user terminal is temporarily stopped, such that the user may shut down the first end-user terminal. The user may then reinitiate the same session at another end-user terminal at a later period such as time t$_2$, by using the session information recorded (i.e., stored) on the MEAD 108. The user is able to reinitiate the session at a second end-user terminal, such as terminal E 106$_e$, by issuing new commands on the MEAD 108, once the MEAD is in vicinity to communicate with the second end-user terminal.

It is noted that the MEAD 108 provides user and session security by encoding the session information stored thereon. Further, the MEAD requests proper user authorization by requesting a user ID number and password, and in one embodiment, the MEAD 108 may include a fingerprint pad (or any other bio-metric security) on the keypad to further prevent unauthorized access to the user's session. Thus, the MEAD 108 is capable of suspending (i.e., freezing or pausing) the current session at a first time, and then reinitiating the same session at a second end-user terminal (e.g., terminal E 106$_e$, at a later time.)

The MEAD 108 is able to pause and reinitiate the session at two different terminals 106 in a secure manner by interacting with a security server 112. In one embodiment, the security server 112 may be a centralized security server illustratively drawn in phantom as shown in FIG. 1. In an alternative embodiment, the security server 112 may be distributed amongst the plurality of network service center 110 affiliated with each of the access networks.

In particular, the security server 112 (drawn in phantom) may be centralized, such that an end-user terminal initiating a secure session is routed directly to the central security server 112 by the local access network 104. In an alternative embodiment, the security server feature 112 may be distributed locally within the network service centers 110 and the MEAD 108. In either embodiment, the security server 112 provides authentication and authorization for session connectivity that is initiated by the MEAD 108 and terminals 106. In another embodiment, the security server may also provide accounting services for the service provider, in a similar manner as an authentication, authorization, and accounting (AAA) server, which is conventionally known in the art.

Figure 2:
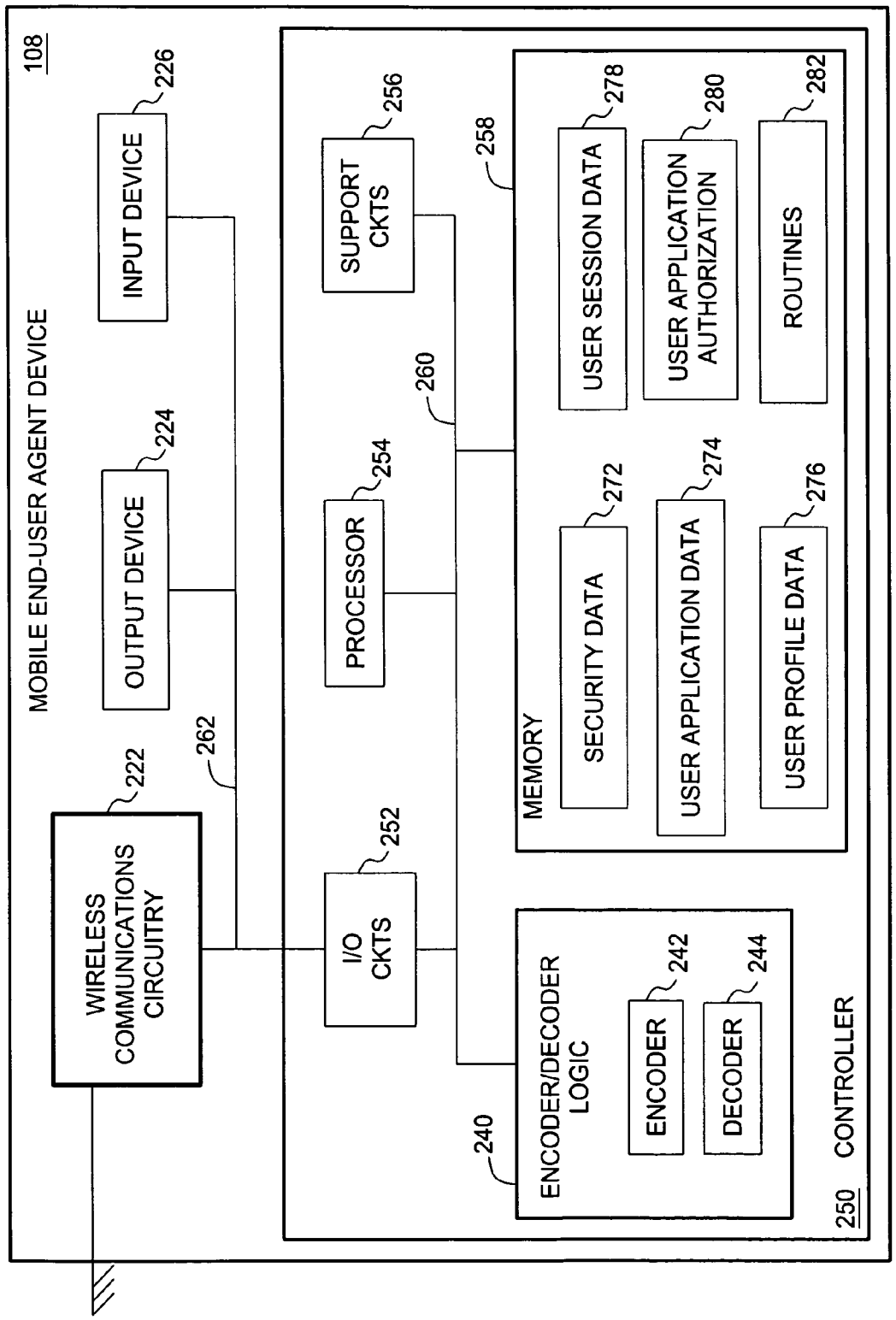
FIG. 2 depicts a block diagram of a mobile end-user agent device suitable for performing a session switchover between end-user terminals according to the principles of the present invention.

FIG. 2 depicts a block diagram of a mobile end-user agent device (MEAD) 108 suitable for implementing the present invention. In particular, the mobile end-user agent device 108 comprises a controller 250 and wireless communication circuitry 222. The controller 250 comprises a processor 254, support circuits 256, I/O circuitry 252, Encoder/Decoder Logic 240, and memory 258. The processor 254, the support circuitry 256, memory 258, I/O circuits 252, and logic circuitry 240 interact (i.e., exchange information) with each other via at least one bus line 260.

The memory 258 stores various control programs 282 and data files associated with a user session. The processor 254 cooperates with a conventional support circuitry 256, such as power supplies, clock circuits, cache, among other support circuitry such as the Encoder/Decoder 240, as well as circuits that assist in executing software routines 282 stored in the memory 258. As such, it is contemplated that some of the process steps discussed herein as software processes may be implemented within hardware, for example, as circuitry that cooperates with the processor 254 to perform various steps.

The controller 250 also contains input/output (I/O) circuitry 252 that forms an interface between various functional elements communicating with the controller 250. In the exemplary embodiment of FIG. 2, the controller 250 optionally communicates with an output device (e.g., display) 224, and a user interface (i.e., input device) 226, such as a keyboard or mouse device. The input and output devices 226 and 224 enable a user to receive (e.g., view) and input information from/to the mobile end-user agent device 108.

The controller 250 also communicates with the wireless communication circuitry 222 via one or more bus lines 262 coupled to the I/O circuitry 252. The wireless communication circuitry 222 is capable of providing wireless communications with the end-user terminals 106, illustratively, under the blue tooth standard or any other conventional wireless communication standard. In an alternative embodiment, the I/O circuitry 252 may include USB ports, wired networking capabilities, such as Ethernet, or any other communications port for exchanging information between the MEAD 108 and the end-user terminals 106 in the network 100. In one embodiment, the data that is transferred between the MEAD 108 and the end-user terminals 106 is always encoded, thereby averting any security threats.

The memory 258 may be any conventional memory such as RAM, programmable memory, flash memory, disk drive, or any other conventional memory devices. The memory is used for storing routines 282 that implement the present invention, as well as the user session information, such as security data 272, user application data 274, user profile data 276, user session data 278, user application authorization 280, a local operating system (not shown), application programs (not shown), among other information necessary to establish and maintain a user session between different end-user terminals 106.

It is noted that the Encoder/Decoder Logic 240 comprises an encoder 242 and decoder 244 to encode and decode data to and from memory 258. The Encoder/Decoder Logic 240 may be implemented as software programming, hardware, and/or a combination thereof, as conventionally known in the art.

Although the controller 250 of FIG. 2 is depicted as a general purpose computer that is programmed to perform various control functions in accordance with the present invention, the invention can be implemented in hardware such as, for example, application specific integrated circuit (ASIC). As such, it is intended that the processes described herein be broadly interpreted as being equivocally performed by software, hardware, or any combination hereof.

Figure 3A:
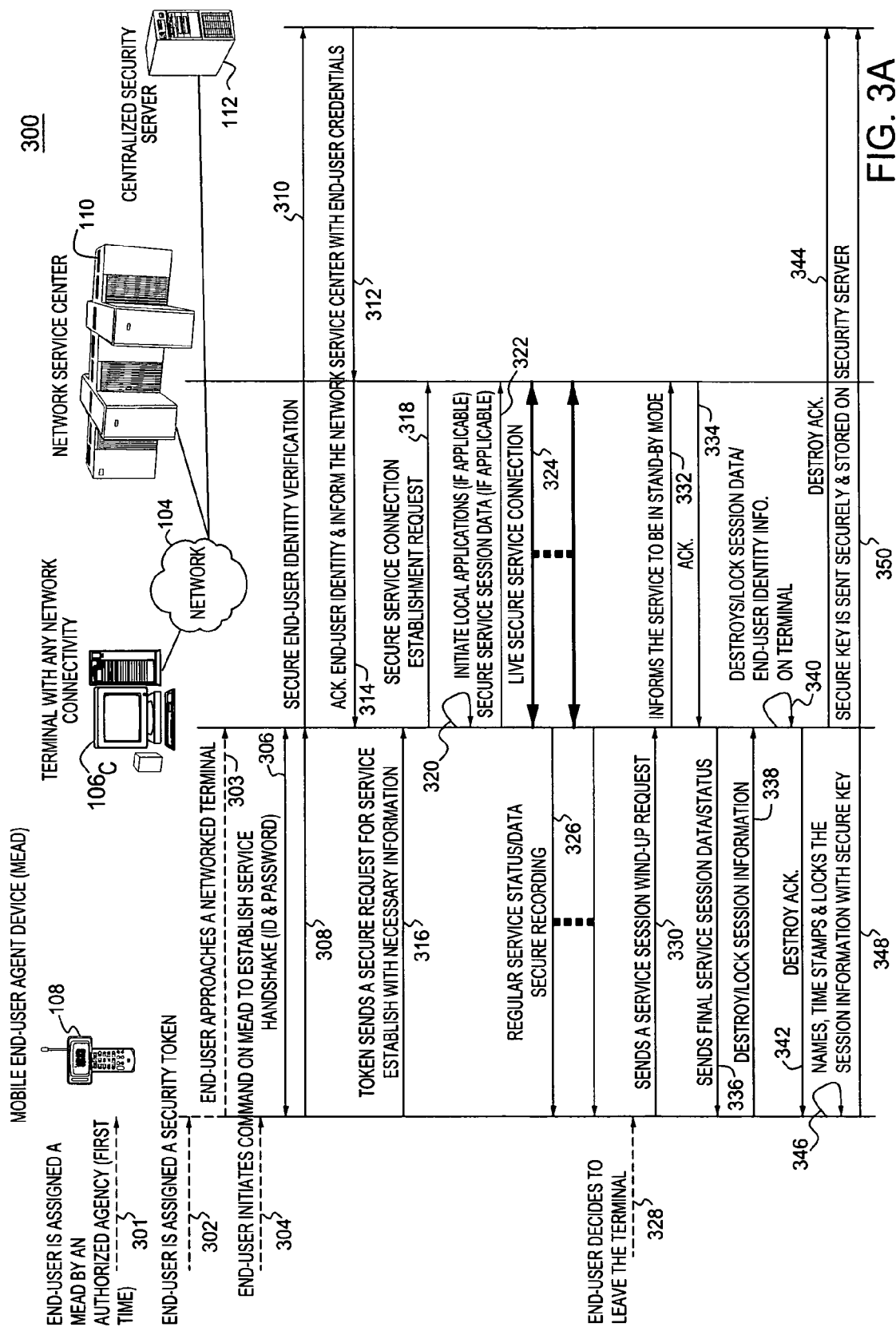
FIGS. 3A and 3B collectively depict a flow diagram of a first embodiment of a method for providing switchover of a session between different end-user terminals.
Figure 3B:
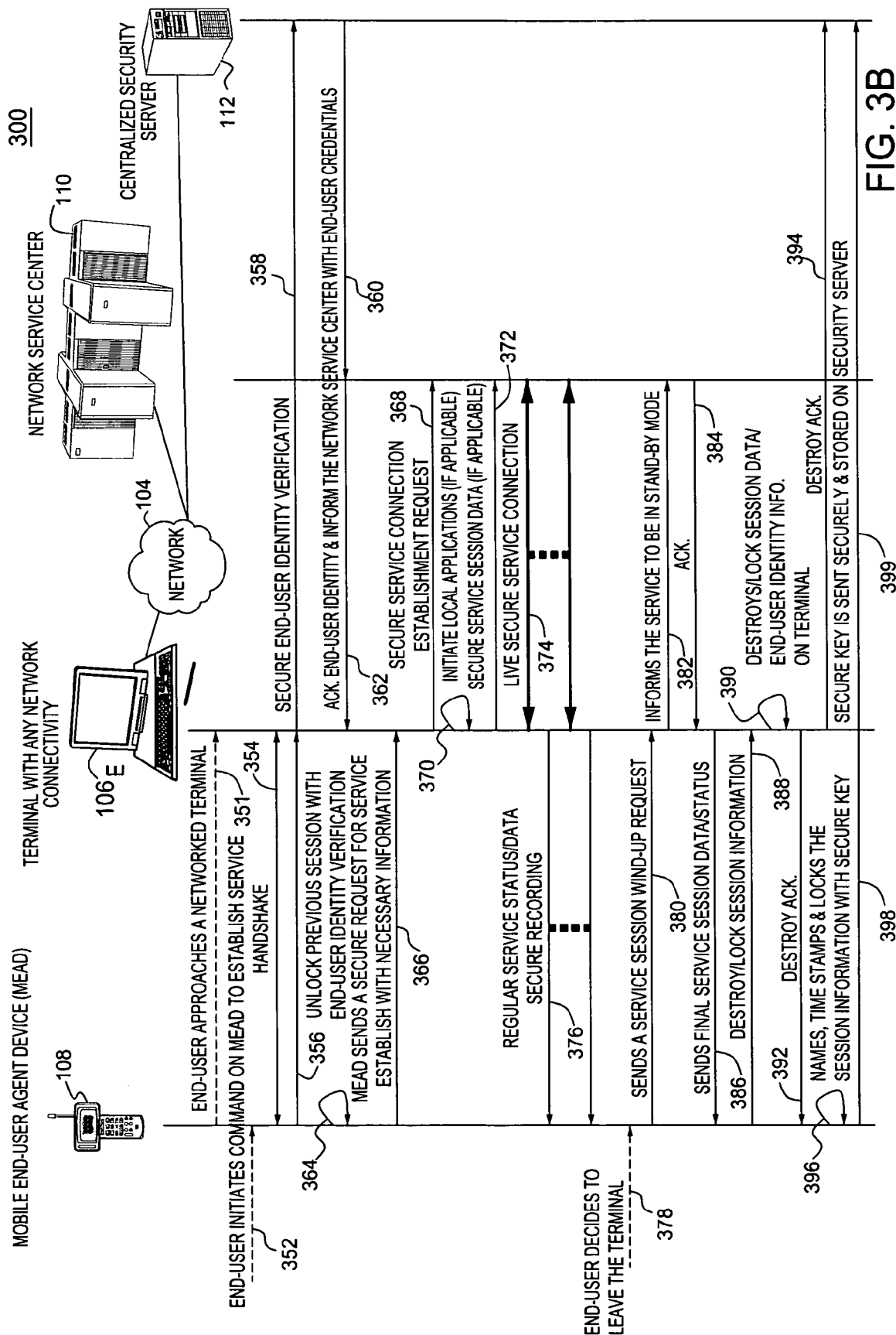

FIGS. 3A and 3B collectively depict a flow diagram of a first embodiment of a method 300 for providing switchover of a session between different end-user terminals 106. The method 300 of FIGS. 3A and 3B are discussed with respect to providing authentication and authorization for a session via a centralized security server 112. In another embodiment, a method 400 is discussed with respect to FIG. 4, where the security server 112 is provided locally within the network service centers 110 and the MEAD 108.

More specifically, FIG. 3A depicts a flow diagram for commencing, running, and suspending an active session at a first end-user terminal, such as terminal C $106_c$ shown in FIG. 1. FIG. 3B depicts a flow diagram for commencing, running, and terminating the same session at a second end-user terminal, such as terminal E $106_e$ shown in FIG. 1.

Referring to FIG. 3A, at step 301, an End-user is assigned a MEAD 108 (for centralized security server functionality) by an authorized agency. Referring to FIG. 3A, steps 302 through 306 provide authentication and security as between the MEAD 108 and the end-user terminal 106. In particular, at step 302, the end user is assigned a security token on MEAD 108. Specifically, an end-user identity manager of the MEAD 108 generates security codes, which have to be used with pass codes that are selected by the end-user, or an end-user specific biometric code (e.g., finger print). At step 303, the user approaches a networked terminal, such as terminal C $106_c$ as shown in FIG. 1, and establishes communications via a communications interface, such as the wireless communications (e.g., Bluetooth) or a wired channel (e.g., Ethernet, USB, among others) as discussed above with respect to FIG. 2. At step 304, the user initiates the MEAD 108 to establish service with the end-user terminal $106_c$. In one embodiment, the MEAD 108 includes an input (e.g., button or switch) on the keypad to initiate service.

Communications between the MEAD 108 and terminal 106 may be facilitated by any conventional communication medium. For example, wireless communications may be utilized, such as Bluetooth and 3G wireless communications. Alternatively, wired communications may be provided via USB, Ethernet, or any other conventional wireless or wired standard. It is noted that the terminal 106 facilitates compatible ports, circuitry, and software to receive the communication signals from the MEAD 108.

The service includes creating a session with the end-user terminal 106, and subsequently a session for information (e.g., content) with one or more network service centers 110, as discussed with respect to steps 308 to 324. At step 306, the end-user provides the user identification number and password to the terminal 106. In one embodiment, the ID number and password are keyed in on the keypad by the user. Alternatively, the ID number and/or password may be stored in memory 258 of the MEAD 108. In this latter embodiment, the initiate service button simply sends the ID number and/or password to the terminal 106. In another embodiment, additional and/or alternative security is provided by a bio-metric input, such as a fingerprint pad also located on the keypad of the MEAD 108. In any of the embodiments, the MEAD 108 and first terminal $106_c$ perform a handshake as conventionally known in the art, such that the MEAD 108 is in communication with the first end-user terminal 106. It is noted that the end-user terminal 106 also stores software programming (e.g., an application program) designed to exchange information (e.g., messages) with the MEAD 108, network service center 110, and centralized security server 112.

At step 308, the end-user utilizes the MEAD 108 to secure end-user identity verification from the centralized security server 112. The identity verification is used by the network service center 110 to authenticate the user to receive services. In one embodiment, identity verification is requested by sending end-user credentials (including user-ID, passwords, etc.) along with the information of the services sought from the MEAD to the terminal 106, which forwards the request to the centralized security server 112 via the local access network 104 (e.g., broadband access network $104_n$ of FIG. 1).

At step 312, the security server 112 verifies the identity of the end user by comparing the information sent to the server 112 with client information stored at the server 112. If the user is not verified, a rejection message is sent back to the network center 110 and terminal 106, thereby rejecting user verification. Otherwise, if the security server 112 verifies the end-user's credentials, an acknowledgement message is sent to the network service center 110, which forwards the acknowledgement message back to the terminal 106 at step 314.

At step 316, the MEAD 108 sends a secure request for service establishment to the first terminal 106 using the security token. The secure request includes user identity information, including information identifying the MEAD 108 in an encoded format. At step 318, the first terminal $106_c$ forwards the secure service connection establishment request to the network service center $110_n$ via the local access network $104_n$. At this point in method 300, the network service center 110 initiates a user session.

At optional step 320, local applications may be initiated at the end-user terminal. The local applications include various software programs (i.e., applications) that the user wishes to interface with during the session. For example, the applications may include gaming programs, web browsing programs, word processing, email, Intranet access to corporate databases, audio/video on demand, CRM, among other conventional application programs.

Alternatively or additionally, at step 322, the user may optionally request secure service session data from the network service center. The session data may include secure service request (like logging on to an Intranet using VPN) with associated end-user ID and passwords, among other types of session data from the network service center 110.

At step 324, the network service center 110 interacts with the end-user terminal to receive request for session data, and in response, sends such session data in a secure manner back to the end-user terminal 106. The interaction between the first terminal 106 and network service center 110 continues as long as the user desires. During the course of the user interaction between the first terminal 106 and the network service center, at step 326, the MEAD 108 records the latest data retrieved by the terminal, as well as the latest session status and data. The MEAD 108 continuously records and updates the information as the user session progresses. That is, the MEAD records all pertinent information (status and data) to maintain the current session, including information from the first end-user terminal 106, the service center 110, and the centralized security server 112.

Eventually, the end-user will decide to leave the presence of the first end-user terminal $106_c$, and either shut off the session or suspend the current session, in accordance with the principles of the present invention. At step 328, the user decides to leave the terminal $106_c$. At step 330, the MEAD 108 sends a service session wind-up request. In one embodiment, the user depresses a terminate service button on the keypad of the MEAD 108, which sends the wind-up request to the first terminal $106_c$. At step 332 the exemplary first terminal $106_c$ sends a message to the network service center 110 to initiate a standby mode of operation. During the standby mode of operation, the network service center 110 suspends serving the end-user terminal 106, and waits to receive further instructions for the session.

At step 334, the service center 110 sends an acknowledgement message to the first terminal $106_c$. At step 336, the terminal 106 forwards final service session data/status to the MEAD 108 for storage, thereby updating the MEAD 108 with the latest session information. For example, the MEAD 108 stores the final session information, such as the latest user session data 278, user application data 274, security data 272, user profile data 276, and any other pertinent information regarding the session.

At step 338, the MEAD sends a destroy/lock session information message to the exemplary first terminal 106$_c$. At step 340, the terminal 106$_c$ locks the session data for the session that is in standby mode, and destroys (i.e., erases) the end-user identity information stored on the terminal 106. Once the end-user identification information is removed from the memory in the terminal 106, at step 342, an acknowledgement signal confirming destruction of the user identification information is returned to the MEAD 108. Additionally, at step 344, the terminal 106$_c$ sends a duplicate destroy acknowledgement message to the centralized security server 112. In this manner, both the MEAD 108 and security server 112 are notified that the user's identification information has been removed from the terminal, and the current session at the first terminal is terminated.

At step 346, the user gives the currently suspended session a name. The session name may be any suitable name. The MEAD 108 time stamps the session, and locks the session information with a secure key. Thus, the session information in the MEAD 108 is protected. At step 348, the session name, timestamp information, and the secure key for the session information is sent to the terminal 106$_c$. At step 350, the terminal 106$_c$ forwards the secure key to the centralized security server 112, where it is stored for future access. Thus, steps 328-350 enable a user to suspend the current session, by locking the session data, encoding the locked data with a secure key, and storing the key at the centralized security server 112 for future access at a different end-user terminal.

FIG. 3B illustrates how the user restarts the suspended session described in steps 301-350 of FIG. 3B. Referring to FIG. 1, the user has illustratively relocated their location to a different terminal, i.e., terminal E 106$_e$. At step 351, the user approaches the second end-user terminal (e.g., terminal E 106$_e$), and at step 352, the end-user initiates a security token on the MEAD 108 to establish service from the second terminal 106$_e$.

At step 354, a handshake between the second terminal 106$_e$ and the MEAD 108 is performed, in a similar manner as discussed above with respect to the first terminal 106$_c$ at step 306 of FIG. 3A. At step 356, the MEAD 108 sends a secure end-user identity verification message to the second terminal 106$_e$, which forwards the identity verification message to the centralized security server 112 at step 358. At step 360, the security server 112 sends an acknowledgement message back to the network service center 110 indicating that the end-user identity and information has been authenticated. At step 362, the network service center 110 forwards the acknowledgement message to the second terminal 106$_e$, thereby enabling the second terminal to facilitate a user session.

The user may initiate a new session at the second terminal 106$_e$, or restart the previously suspended session that was run at the first terminal 106$_c$. That is, the MEAD 108 is capable of recording session data from multiple sessions, as well as restarting a previously suspended session.

At step 364, the user decides to unlock the previous session. In particular, the end-user uses the identity verification information utilized to initiate the suspended session. The user may unlock the previous session by providing the appropriate user ID and password information, and/or providing biometric information, such as a fingerprint to the MEAD 108.

At step 366, the user instructs the MEAD 108 to send a secure request to the second terminal 106$_e$ for service establishment with the necessary information. Using the security token, the MEAD 108 initiates the secure request, as discussed above with respect to step 316 of FIG. 3A. Specifically, the secure token includes the session name, timestamp information, as well as any other session and user identifying information. At step 368, the second terminal 106$_e$ forwards the secure service connection establishment request to the network service center 110. At this point, the user is able to reinitiate the suspended session at the network service center 110 by activating the session (i.e., the suspended session is no longer in standby mode).

At step 370, the user optionally initiates a local application program on the second terminal 106$_e$, such as a web browser, among others, as discussed above with respect to steps 320. Alternatively, at step 372, the user may request service session data from the network service center 110, as discussed above with respect to step 322. At step 374, the live secure service connection is provided between the second terminal 106$_e$ and the network service center 110. Thus, the user is able to request and retrieve information from the network service center 110 at the second terminal 106$_e$.

At step 376, the session information and session status is continuously stored and updated by the MEAD 108. The MEAD 108 stores the session information in memory in a similar manner as discussed above with respect to step 326 of FIG. 3A. At some time after the session has progressed, at step 378 the user decides to leave the second terminal 106$_e$.

At step 380, the user then sends a termination signal (i.e., from the keypad of the MEAD 108) to the second terminal that includes a session wind-up request. Thus, the second terminal 106$_e$ is notified that the user wishes to either suspend or terminate the session. At step 382, the second terminal notifies the network service center 110 to switch from an active session to a stand-by mode. At step 384, the network service center 110 switches to session standby and sends an acknowledgement message back to the second terminal 106$_e$. At step 388, the second terminal then sends the final service session status and data to be stored on the MEAD 108.

At step 388, the MEAD sends a destroy/lock session information message to the exemplary second terminal 106$_e$. At step 390, the second terminal 106$_e$ locks the session data for the session that is in standby mode, and erases the end-user identity information stored on the terminal 106. Once the end-user identification information is removed from the memory in the terminal 106, at step 392, an acknowledgement signal confirming the destruction of the user identification information is returned to the MEAD 108. Additionally, at step 394, the terminal 106$_e$ sends a duplicate destroy acknowledgement message to the centralized security server 112. In this manner, both the MEAD 108 and security server 112 are notified that the user's identification information has been removed from the terminal, and the current session at the first terminal is terminated.

At step 396, the user gives the currently suspended session a name, and the MEAD 108 time stamps the session, and locks the session information with a secure key. Additionally, any other sessions created at the second terminal are also given a unique name and timestamp to identify the session for further interaction at a later time at a different terminal 106.

Thus, the session information in the MEAD 108 is protected. At step 398, the session names, timestamp information, and the secure key for the session information is sent to the second terminal 106$_e$. At step 399, the second terminal 106$_e$ forwards the secure key to the centralized security server 112, where it is stored for future access. Thus, steps 378-399 enable a user to suspend the current session by locking the session data, encoding the locked data with a secure key, and storing the key at the centralized security server 112 for future access at a different end-user terminal.

Figure 4:
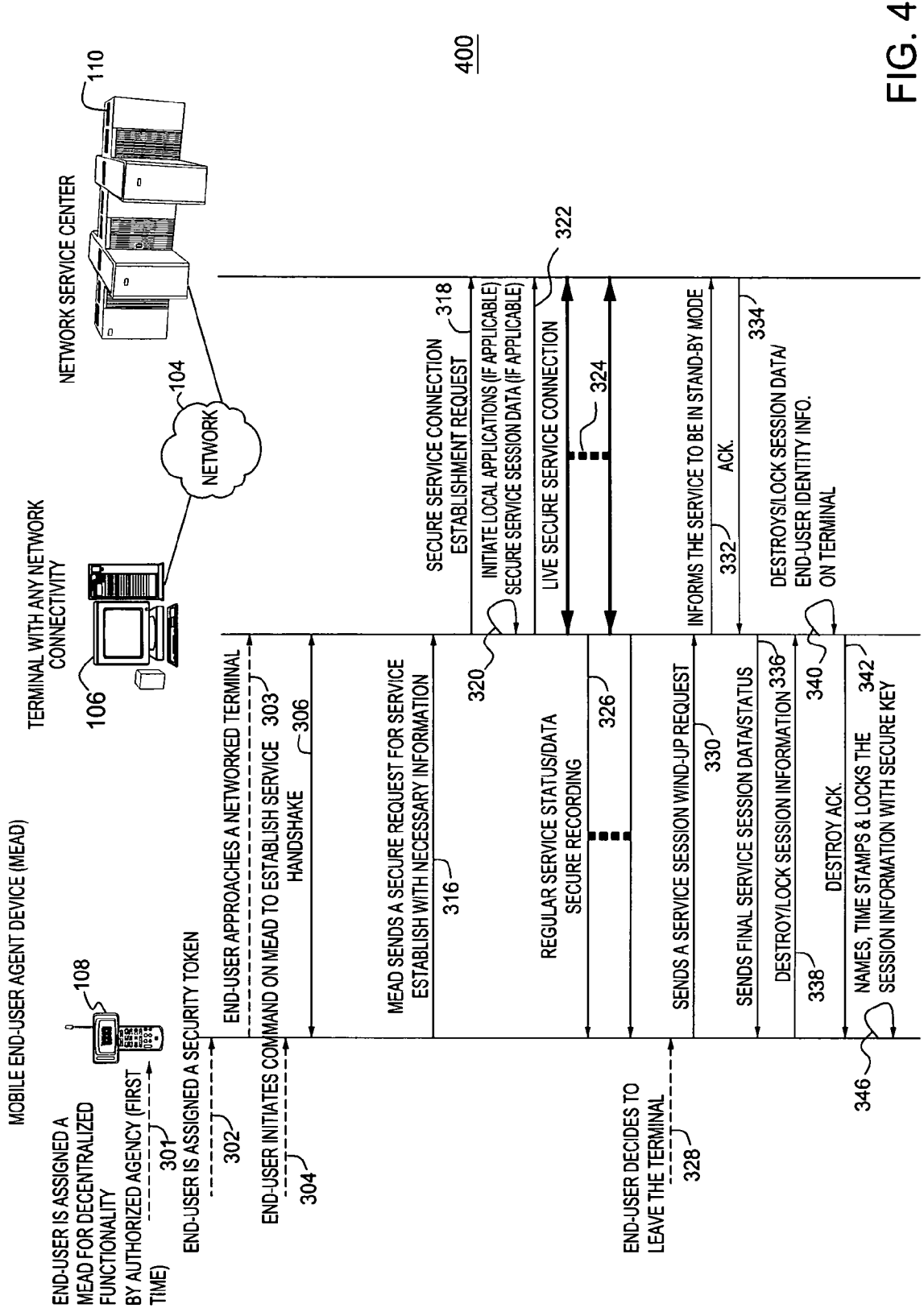
FIG. 4 depicts a flow diagram of a second embodiment of a method for providing switchover of a session between different end-user terminals.

FIG. 4 depicts a flow diagram of a second embodiment of a method 400 for providing switchover of a session between different end-user terminals 106. In this second embodiment, the session switchover between different end-user terminals may be provided without a centralized security server 112. In this second embodiment, verification of the user's identity and session information is established at the terminals, and verification is not performed by a centralized security server.

Referring to FIG. 4, step 301 is the first step where an End-user is assigned a MEAD 108 (for decentralized security server functionality) by an authorized agency. Steps 302 through 306 provide authentication and security as between the MEAD 108 and the end-user terminal 106, as discussed above with respect to method 300 of FIGS. 3A and 3B. In particular, at step 302, the end user is assigned a security token on MEAD 108. Specifically, an end-user identity manager of the MEAD 108 generates security codes, which have to be used with end-user chosen pass codes or an end-user specific biometric code (e.g., finger print). At step 303, the user approaches a networked terminal, such as terminal C $106_c$ as shown in FIG. 1, and establishes communications via a communications interface (e.g., Bluetooth, Ethernet, USB, among others). At step 304, the user initiates the token to establish service.

At step 306, the end-user provides the user identification number and password to the terminal 106. In one embodiment, the ID number and password are keyed in on the keypad by the user. Alternatively, the ID number and/or password may be stored in memory 258 of the MEAD 108 such the initiate service button simply sends the ID number and/or password to the terminal 106. A handshake is provided from the terminal 106 back to the MEAD 108, thereby authenticating the user and the MEAD 108 with the terminal 106.

The method 400 then proceeds to step 316. It is noted that steps 308 through 314 of method 300 are not utilized in method 400, since these steps facilitate exchange of information with respect to verifying the user identity with the centralized security server 112. Recall, that this second embodiment does not utilize the centralized security server 112, but instead uses decentralized security servers 112.

At step 316, the MEAD 108 sends a secure request for service establishment to the first terminal 106 using the security token. The secure request includes user identity information, including information identifying the MEAD 108 in an encoded format. At step 318, the first terminal $106_c$ forwards the secure service connection establishment request to the network service center $110_n$ via the local access network $104_n$. At this point in method 400, the network service center 110 initiates a user session.

At optional step 320, local applications may be initiated at the end-user terminal. The local applications include various software programs (i.e., applications) that the user wishes to interface with during the session. For example, the applications may include gaming programs, web browsing programs, word processing, email, Intranet access to corporate databases, audio/video on demand, CRM, among other conventional application programs. Alternatively or additionally, at step 322 the user may optionally request secure service session data from the network service center.

At step 324, the network service center 110 interacts with the end-user terminal to receive request for session data, and in response, sends such session data in a secure manner back to the end-user terminal 106. The interaction between the terminal 106 and network service center 110 continues as long as the user desires. During the course of the user interaction between the first terminal 106 and the network service center, at step 326, the MEAD 108 records the latest data retrieved by the terminal, as well as the latest session status and data. The MEAD 108 continuously records and updates the information as the user session progresses. That is, the MEAD records all pertinent information (status and data) to maintain the current session, including information from the first end-user terminal 106, the service center 110, and the centralized security server 112.

Eventually, the end-user will decide to leave the presence of the first end-user terminal $106_c$, and either shut off the session or suspend the current session, in accordance with the principles of the present invention. At step 328, the user decides to leave the terminal $106_c$. At step 330, the MEAD 108 sends a service session wind-up request. In one embodiment, the user depresses a terminate service button on the keypad of the MEAD 108, which sends the wind-up request to the first terminal $106_c$. At step 332 the exemplary first terminal $106_c$ sends a message to the network service center 110 to initiate a standby mode of operation, as discussed above with respect to FIGS. 3A and 3B.

At step 334, the service center 110 sends an acknowledgement message to the first terminal $106_c$. At step 336, the terminal 106 forwards final service session data/status to the MEAD 108 for storage, thereby updating the MEAD 108 with the latest session information. For example, the MEAD 108 stores the final session information, such as the latest user session data 278, user application data 274, security data 272, user profile data 276, and any other pertinent information regarding the session.

At step 338, the MEAD sends a destroy/lock session information message to the exemplary first terminal $106_c$. At step 340, the terminal $106_c$ locks the session data for the session that is in standby mode, and destroys (i.e., erases) the end-user identity information stored on the terminal 106. Once the end-user identification information is removed from the memory in the terminal 106, at step 342, an acknowledgement signal confirming destruction of the user identification information is returned to the MEAD 108. Additionally, at step 344, the terminal $106_c$ sends a duplicate destroy acknowledgement message to the centralized security server 112. In this manner, both the MEAD 108 and security server 112 are notified that the user's identification information has been removed from the terminal, and the current session at the first terminal is terminated.

At step 346, the user gives the currently suspended session a name, as discussed above with respect to method 300. The MEAD 108 time stamps the session, and locks the session information with a secure key. Thus, the session information in the MEAD 108 is protected. Thus, steps 328-346 enable a user to suspend the current session, by locking the session data, encoding the locked data with a secure key, and storing the session information at the MEAD 108 for future access at a different end-user terminal. That is, the user may relocate to another end-user terminal, such as exemplary terminal E $106_e$ in FIG. 1, and restart the very same session by repeating method 400 at the second terminal.

The embodiments shown and discussed herein enable a person who wants to interact with a network, such as the internet, to obtain information (e.g., content) from different end-user terminals. Specifically, the user is able to initiate a session for information with their access network, and relocate to another end-user terminal at a later time by suspending the current session at the first terminal, and subsequently restarting the same session at the other end-user terminal. The present methods described herein are indifferent to the types of networks that the terminals are connected. Further, the user may connect to a first network via a first terminal, and connect to a different network via a different second end-user terminal.

The end user utilizes a mobile end-user agent device (MEAD) 108 that securely establishes a session with the end-user terminals, and in one embodiment, a centralized security server 112, to record pertinent session information and data. The MEAD 108 continually updates session related information, such that at a time a user desires to suspend the current session, the latest session information is stored therein in order to restart the session at a later time. The suspended session may be restarted at any end-user terminal connected to any type of network.

The MEAD 108 provides authentication and security features in order to ensure end-user privacy. Thus, the transactions between the MEAD 108 and end-user terminals 106 are secure and based on end-user authentication. The data stored on the MEAD from transactions with the end-user terminals 106 is stored in an encoded format. In one embodiment, encoding key-codes are changed at regular intervals such that the data is encoded and stored at these intervals. Another security feature includes erasing the session related encoded data on the end-user terminal once the user suspends or terminates the current session.

As shown and discussed with respect to FIGS. 3A and 3B, the network 100 includes a centralized security server 112. The advantages of implementing a centralized security server 112 include constant verification and monitoring of end-user security. Additionally, more end-user information can be stored on the centralized security server 112 compared to the MEAD 108, and the stored information on the centralized security server 112 can be downloaded on demand.

Alternatively, as shown and discussed with respect to method 400 of FIG. 4, the centralized security server 112 is not utilized. An advantage of this decentralized embodiment includes providing complete control to the end-user. This embodiment may put more burden (or risk) on end-user to secure the MEAD 108, which means the end-user has to carry more authentication and services information on the MEAD 108. However, the session information stored on the MEAD 108 is encoded to reduce such security risks.

One advantage of the present invention includes allowing users to continue applications where they left off from a previous end-user terminal. Another advantage is that the compact size of the MEAD relieves end-users from carrying (heavy) terminals (like laptops). For example, the MEAD 108 may be integrated with a PDA/Phone to form a single device.

Other advantages include session access/information is available 24×7, multi end-user security levels, where one user can act as a primary-user and give access to a group of users, as well as even if an end-user looses the MEAD 108, their data is not compromised since everything is encoded and stored securely thereon.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method of performing switchover of a session between different user terminals, comprising:
   receiving at a mobile end-user agent device (MEAD), from a first device, data representing a session, said session data comprising application and authentication data required to reestablish the session;
   suspending said session at said first device;
   reestablishing via said MEAD said suspended session on a second device using said suspended session data;
   naming said suspended session;
   timestamping said suspended session; and
   encoding said suspended session information with a secure key.

2. The method of claim 1, further comprising:
   initiating said session from said first device coupled to a first access network; and
   reestablishing said suspended session from said second device coupled to a second access network.

3. The method of claim 1, further comprising:
   verifying, from said first device, user identity from a centralized security server.

4. The method of claim 1, further comprising:
   storing said data representing said session received from said first device at said MEAD.

5. The method of claim 4, further comprising:
   encoding said received data prior to storage.

6. The method of claim 1, further comprising:
   initiating said session by sending a security token to said first device.

7. The method of claim 1, further comprising:
   conducting said session by initiating application programs local to said first device.

8. The method of claim 1, further comprising:
   conducting said session by initiating service connectivity from a network service provider.

9. The method of claim 1, wherein said suspending said session comprises:
   sending a termination signal from said MEAD to said first device.

10. The method of claim 9, wherein said suspending said session comprises:
    setting said session in a standby mode of operation.

11. The method of claim 1, wherein said suspending said session comprises:
    erasing end-user identity information at said first device.

12. The method of claim 1, further comprising:
    storing said secure key at a centralized security server.

13. The method of claim 1, wherein said reestablishing said suspended session on a second device comprises:
    requesting user identity verification from a centralized security server; and
    unlocking said suspended session using verification from said centralized security server.

14. Apparatus for performing switchover of a session between different user terminals, comprising:
    a processor and a memory communicatively connected to said processor, said processor configured for:
    receiving at a mobile end-user agent device (MEAD), from a first device, data representing a session, said session data comprising application and authentication data required to reestablish the session;
    suspending said session at said first device;
    reestablishing via said MEAD said suspended session on a second device using said suspended session data;
    naming said suspended session;
    timestamping said suspended session; and
    encoding said suspended session information with a secure key.

15. The apparatus of claim 14, said processor further configured for:
    initiating said session from said first device coupled to a first access network; and reestablishing said suspended session from said second device coupled to a second access network.

16. The apparatus of claim 14, said processor further configured for:
    storing said data representing said session received from said first device at said MEAD.

17. The apparatus of claim 14, wherein, for suspending said session, said processor is configured for:
    sending a termination signal from said MEAD to said first device.

18. The apparatus of claim 14, wherein, for suspending said session, said processor is configured for:
    erasing end-user identity information at said first device.

19. An end-user agent device for performing switchover of a session between different user terminals, comprising:
    at least one port adapted for receiving from a first device, data representing a session, said session data comprising application and authentication data required to reestablish the session;
    a storage device adapted for storing said session data and user profile information; and
    a processor coupled to said at least one port and said storage device, said processor configured to execute commands to suspend said session at said first device, reestablish said suspended session on a second device using said suspended session data, name said suspended session, timestamp said suspended session, and encode said suspended session information with a secure key, wherein said end-user agent device is mobile.

* * * * *